US010221087B2

(12) United States Patent
Caiata et al.

(10) Patent No.: US 10,221,087 B2
(45) Date of Patent: Mar. 5, 2019

(54) PLANT FOR PRODUCING AN ELONGATE ELEMENT USABLE FOR PRODUCING AN OPTICAL FIBRE

(71) Applicants: Marco Antonio Caiata, Pontecagnano-Falano (IT); Franco Cocchini, Cava del Tirreni (IT); Giuseppe Ferri, Cava del Tirreni (IT); Andrea Mazzotti, Rende (IT); Alessandro Rossi, Baronissi (IT); Antonio Schiaffo, Salerno (IT)

(72) Inventors: Marco Antonio Caiata, Pontecagnano-Falano (IT); Franco Cocchini, Cava del Tirreni (IT); Giuseppe Ferri, Cava del Tirreni (IT); Andrea Mazzotti, Rende (IT); Alessandro Rossi, Baronissi (IT); Antonio Schiaffo, Salerno (IT)

(73) Assignee: PRYSMIAN CAVI E SISTEMI ENERGIA S.R.L., Milan (IT)

( * ) Notice: Subject to any disclaimer, the term of this patent is extended or adjusted under 35 U.S.C. 154(b) by 0 days.

(21) Appl. No.: 14/193,397

(22) Filed: Feb. 28, 2014

(65) Prior Publication Data

US 2014/0174136 A1 Jun. 26, 2014

Related U.S. Application Data

(62) Division of application No. 10/169,125, filed as application No. PCT/EP00/13090 on Dec. 21, 2000, now Pat. No. 8,695,379.

(Continued)

(30) Foreign Application Priority Data

Dec. 29, 1999 (EP) ..................................... 99126122

(51) Int. Cl.
 *C03B 37/012* (2006.01)
 *C03B 23/047* (2006.01)

(52) U.S. Cl.
 CPC ...... *C03B 37/01242* (2013.01); *C03B 23/047* (2013.01); *C03B 37/0124* (2013.01); *C03B 37/0126* (2013.01)

(58) Field of Classification Search
 CPC .............. C03B 23/047; C03B 37/0124; C03B 37/0126; C03B 37/03
 See application file for complete search history.

(56) References Cited

U.S. PATENT DOCUMENTS 2,532,091 A 11/1950 Everett
3,485,613 A 12/1969 Herczog et al.
(Continued)

FOREIGN PATENT DOCUMENTS

EP 0 367 871 5/1990
EP 0 630 865 A1 12/1994
(Continued)

OTHER PUBLICATIONS

Hideo, H., "Device for Drawing Preform Base Material for Optical Fiber", Patent Abstracts of Japan of JP 05078139, (Mar. 30, 1993).
(Continued)

*Primary Examiner* — John M Hoffmann
(74) *Attorney, Agent, or Firm* — Finnegan, Henderson, Farabow, Garrett & Dunner, L.L.P.

(57) ABSTRACT

Apparatus for applying traction to an elongate cylindrical element produced by fusion of an end portion of a preform of glass material, in which a traction device is capable of being connected to a portion of the elongate cylindrical element to provide traction of the elongate cylindrical element along an axis. A device for the rotation of the elongate
(Continued)

cylindrical element applies a twist to the elongate cylindrical element about the axis simultaneously with the traction.

3 Claims, 6 Drawing Sheets

Related U.S. Application Data

(60) Provisional application No. 60/174,810, filed on Jan. 7, 2000.

(56) References Cited

U.S. PATENT DOCUMENTS

| | | | |
|---|---|---|---|
| 4,195,980 A | 4/1980 | Sterling et al. | |
| 4,310,339 A | 1/1982 | Blankenship | |
| 4,407,667 A | 10/1983 | Le Noane et al. | |
| 4,771,958 A | 9/1988 | Hewitt | |
| 4,822,399 A | 4/1989 | Kanamori et al. | |
| 5,314,517 A | 5/1994 | Koening et al. | |
| 5,364,071 A * | 11/1994 | Lu | B66F 3/245 |
| | | | 254/124 |
| 5,788,734 A | 8/1998 | Hoshino et al. | |
| 6,094,941 A | 8/2000 | Fujinoki et al. | |
| 6,324,872 B1 * | 12/2001 | Blaszyk et al. | 65/504 |

FOREIGN PATENT DOCUMENTS

| | | |
|---|---|---|
| EP | 0 846 665 A2 | 6/1998 |
| GB | 1 315 447 | 5/1973 |
| JP | 07069665 A | 3/1995 |

OTHER PUBLICATIONS

JP 07069665 A; English Abstract and Machine Translation.

* cited by examiner

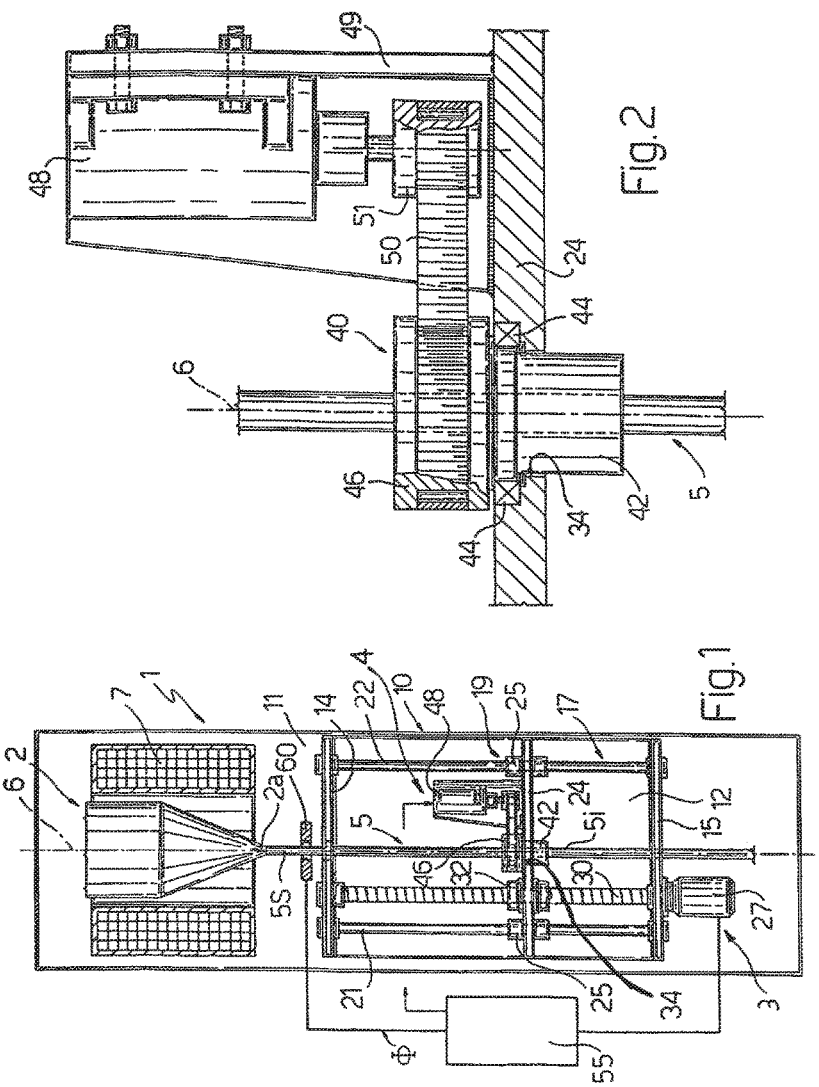

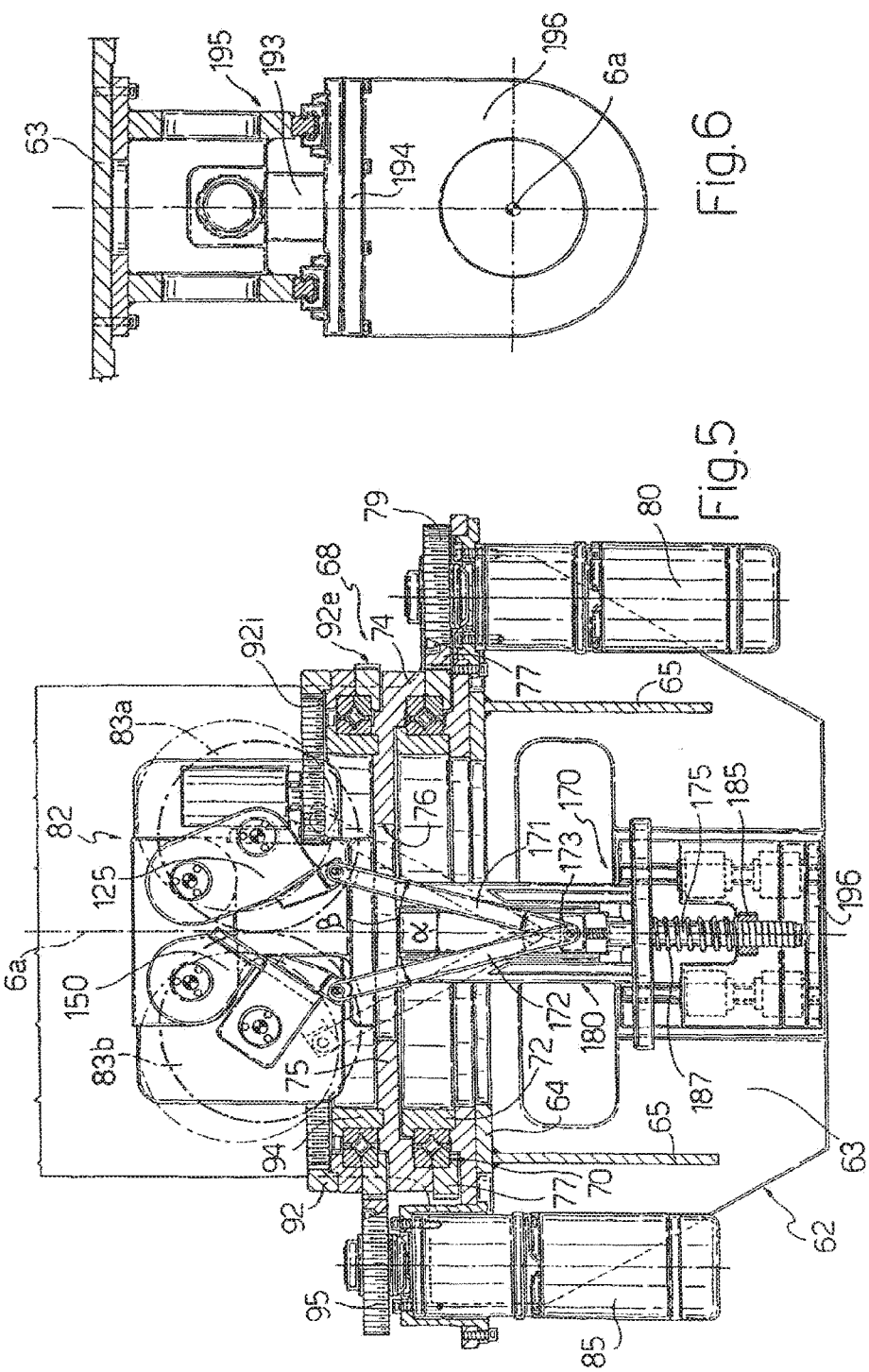

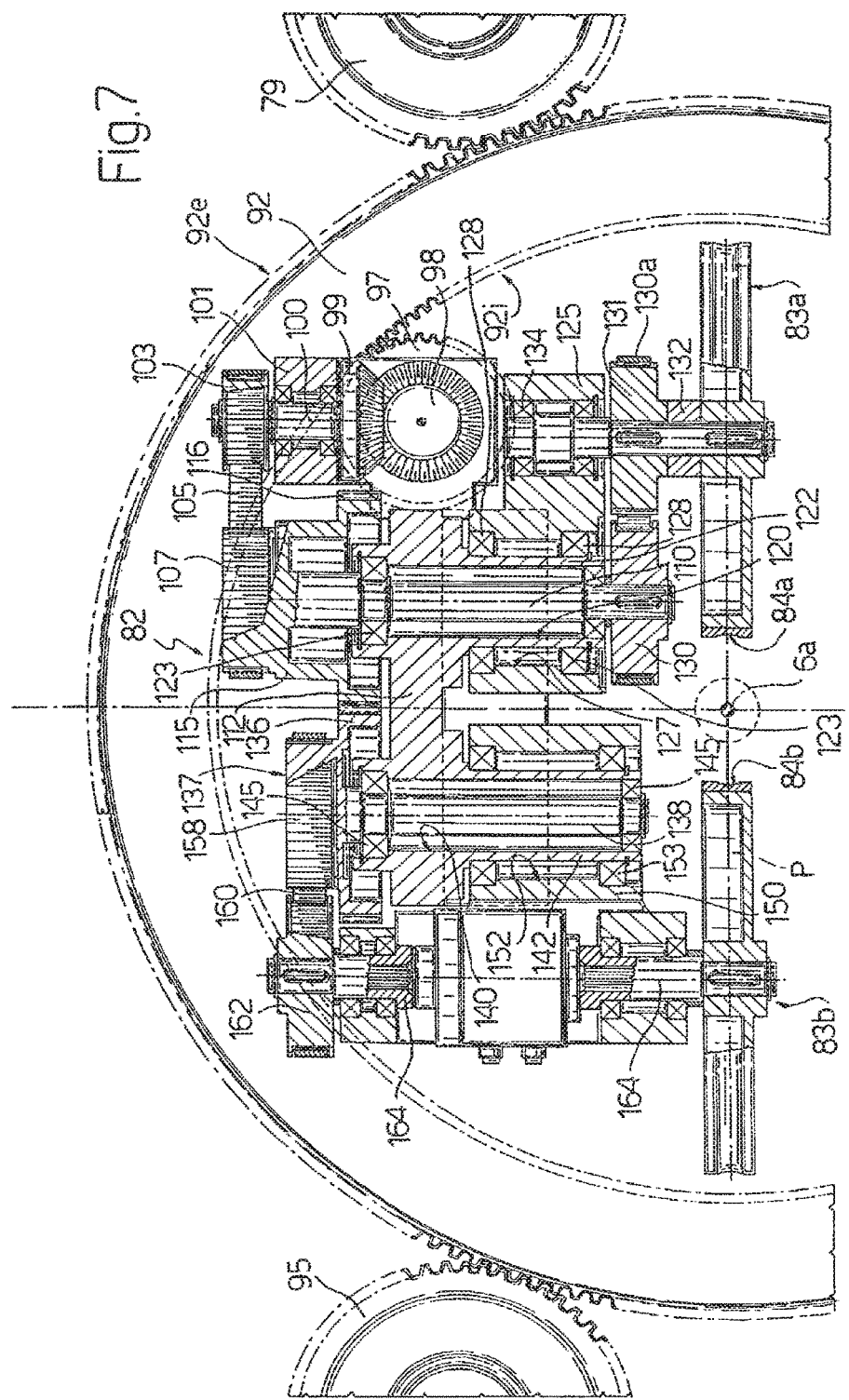

PLANT FOR PRODUCING AN ELONGATE ELEMENT USABLE FOR PRODUCING AN OPTICAL FIBRE

CROSS REFERENCE TO RELATED APPLICATIONS

This is a divisional of U.S. application Ser. No. 10/169,125, filed Nov. 12, 2002, which is incorporated herein by reference and is a national phase application based on PCT/EP00/13090, filed Dec. 21, 2000, the contents of which are incorporated herein by reference, and claims the priority of European Patent Application No. 99126122.3, filed Dec. 29, 1999, and the benefit of U.S. Provisional Application No. 60/174,810, filed Jan. 7, 2000, the contents of which are incorporated herein by reference.

BACKGROUND OF THE INVENTION

Field of the Invention

The present invention relates to an apparatus and method for applying traction to an elongate element which is produced by fusing a preform of glass material and is usable in a process for producing an optical fibre.

Description of the Related Art

As is known, an optical fibre is produced by a process of drawing a preform of glass material. In particular, there is a known method of placing the preform in a vertical position inside a furnace to cause the fusion of a lower portion of the preform. The fused material is then stretched downwards by a traction device, thus producing a threadlike element which forms the optical fibre.

The patent EP 367871 in the name of Corning Glass Works describes a method for making an optical fibre of the step index type, having a sharp change in the refractive index between the core and the cladding. This method comprises an initial stage of depositing particles of glass comprising a base glass and a refractive index-increasing dopant on a support ("mandrel"). The mandrel is then removed and the resulting preform ("soot preform") is consolidated in such a way as to form a core preform having a surface region with a low dopant content. The core preform is stretched and the hole present in it is closed in such a way as to form a core bait rod. The cladding glass soot is then deposited on the core rod at a density of at least 0.5 g/cc. This is done by directing the flame of an auxiliary burner onto the core bar immediately before the cladding soot is deposited on it. In this way, a final preform is produced, and this is consolidated and drawn to produce an optical fibre.

A process of the type described above for producing a final preform is commonly known as the OVD (outside vapour deposition) process.

Also according to the patent EP 367871, the core preform is stretched by using a traction device comprising a pair of powered traction wheels (indicated by 52 in FIG. 3 of the patent in question) which apply a downward traction on opposite sides of the core rod.

The applicant has noted that, in the execution of this last stage, it is possible that, as a result of an imprecise positioning and/or operation of the traction wheels, opposite sides of the core rod undergo different stresses which cause the core rods to bend during its forming process; therefore the production of core rods which are not perfectly rectilinear, in other words which have shape defects, is possible.

The applicant has also noted that the bending of the core rod may also be introduced by non-uniformities of the temperature within the vertical furnace.

GB 1315447 relates to an apparatus adapted for drawing pipes or bars, particularly quartz ones, from blanks of large diameter, and addresses the problem of sagging of the pipe in a heating zone of a known apparatus, which causes a general deformation of the finished quartz pipe, as well as an inadequate fusion of the pipe. The apparatus of GB 1315447 comprises a head adapted for feeding a blank to a system of gas burners, a head for drawing a finished pipe, a drive with a shaft servicing both heads and providing for rotational movement of the pipe and the blank, and two further drives servicing both heads and providing for axial movement of the pipe.

The applicant has observed that the aforesaid shape defects may lead to the presence of a non-negligible error of straightness of the core rod during the final stage of chemical deposition.

The applicant has therefore noted that these shape defects may lead to the production of a final preform (from which the optical fibre will subsequently be drawn) which is non-uniform, in other words a preform whose central portion (formed by the core rod) is curved and is at a non-constant radial distance from the outer surfaces of the preform; in other words, if a cross section of the preform is viewed, it may be seen that the central circular portion corresponding to the section of the core rod is not concentric with the circular section corresponding to the section of the final preform. This error of concentricity is maintained during the drawing stage, and the optical fibre which is produced therefore has a core which is not concentric with the cladding.

The core/clad concentricity is a basic parameter of an optical fibre, since it provides a measurement of the extent to which the axis of the core is aligned with the axis of the cladding. More particularly, the concentricity is defined as the distance between the axes of the core and the cladding. Typically, the concentricity must be small (for example, less than 0.5 µm and preferably less than 0.3 µm), so that, when two end portions of two different optical fibres are joined, the attenuation of the transmitted light is low. This is because optical fibres are typically joined by aligning the outer surfaces of their claddings, and therefore, if the cores are not perfectly positioned along the axes of the corresponding fibres, the joint between the two cores may be partial, producing a high-loss joint.

SUMMARY OF THE INVENTION

The present invention makes it possible to mitigate the problem, observed by the applicant in the use of traction devices or apparatus of known types, of the presence of shape defects of the elongate element which forms the core rod.

The applicant has found that, by using an apparatus comprising a traction device for stretching downwards the elongate element which forms the core rod, together with a rotation device for applying a twist to the elongate element about its axis during the traction, it is possible to produce an elongate element with a high degree of straightness.

The rotation device and the traction device therefore form a system for the traction and movement of the elongate element. The rotation device may, for example, comprise a rotatable member carrying the traction device, which in turn comprises, for example, a pair of pulleys which can be connected by a suitable mechanism to the elongate element.

In another embodiment, the rotation device comprises a powered rotatable body which can be connected by means of a mandrel to the elongate element, and is mounted on a vertically movable slide.

The device according to the present invention is therefore suitable for the production of intrinsically straight core rods which assist in the formation of a homogeneous final preform; this final preform, after the drawing process, is suitable for generating an optical fibre in which the core axis is aligned with the cladding axis.

In a first aspect, the present invention relates to a method of applying traction to an elongate cylindrical element produced by the fusion of a preform of glass material, the said cylindrical element being usable in a process of producing an optical fibre, comprising the stages of providing traction of the elongate cylindrical element along an axis of advance and imparting a twist to the elongate cylindrical element about the said axis of advance.

Preferably, the said stages of providing traction and imparting a twist are carried out simultaneously.

The said stage of providing traction can comprise the stages of connecting a body to a portion of the said elongate cylindrical element and providing a motion of translation of the said body along the said axis of advance; the said stage of imparting a twist can comprise the stage of providing the rotation of the said body about the said axis of advance.

The said stage of imparting a twist can also comprise the stages of connecting an auxiliary body to a portion of the said elongate cylindrical element when the said body reaches a limit position, disconnecting the said body from the said elongate cylindrical element, and providing a motion of translation and rotation of the said auxiliary body along and about the said axis of advance.

In a possible variant, the said stage of providing traction can comprise the stages of connecting at least a first and a second traction pulley to the said elongate element and causing the said first and second traction pulleys to rotate about respective axes; the said traction pulleys lie in a common plane and the said stage of imparting a twist can comprise the stage of rotating the said plane in which the pulleys lie about the said axis of advance.

In a further aspect, the present invention relates to an apparatus for applying traction to an elongate cylindrical element produced by fusion of a preform of glass material, the said cylindrical element being usable in a process of producing an optical fibre, the said apparatus comprising a traction device capable of being connected to at least a portion of the said elongate cylindrical element to provide traction of the elongate cylindrical element along an axis of advance, and additionally comprising a rotation device capable of applying a twist to the elongate cylindrical element about the said axis of advance simultaneously with the said traction.

The said traction and twisting devices can comprise at least one body capable of being connected to the said portion of the said elongate cylindrical element and movable both with a rectilinear motion along the said axis to provide the said traction and with a rotary motion about the said axis to provide the said twist.

The said traction device can also comprise a slide carrying the said body and movable along a guide under the force of a first motor.

The said rotation device can comprise a second motor connected to the said body to cause the said body to rotate about the said axis of advance and with respect to the said slide.

The said first motor preferably has an output shaft connected to a screw and the said slide is advantageously provided with a nut engaged with the said screw to provide the movement of the said slide along the said guide under the force of the said first motor.

The said body is preferably integral with a pulley connected by means of a belt to an output shaft of the said second motor.

There may also be an auxiliary traction apparatus in which an auxiliary traction device and an auxiliary rotation device are capable of operating alternately with the said traction device and with the said rotation device to provide, respectively, the said traction and the said twist of the said elongate cylindrical element.

The said auxiliary traction device and the said auxiliary rotation device preferably comprise at least one auxiliary body which is capable of being connected to the said portion of the said elongate cylindrical element and is movable both with a linear motion along the said axis of advance to provide the said traction and with a rotary motion about the said axis of advance to provide the said twist.

In a possible variant, the said traction device can comprise at least one pair of powered traction pulleys capable of being connected to at least one portion of the said elongate cylindrical element and of providing traction of the elongate cylindrical element along the said axis of advance; the said rotation device being capable of providing a rotary motion of the said traction pulleys about the said axis of advance to provide the said twist of the said elongate cylindrical element.

The apparatus can also comprise a positioning device capable of placing the said traction pulleys in at least two positions, including:
  an activation position in which the traction pulleys are essentially tangential to each other and tangential to the axis of advance; and
  a rest position in which the said traction pulleys are spaced apart from each other.

The said positioning device can comprise a first oscillating body supporting a first traction pulley and a second oscillating body supporting a second traction pulley; the said first oscillating body and the said second oscillating body being angularly movable about respective axes of rotation to place the said traction pulleys in the said activation position and in the said rest position.

The said positioning device can comprise a pair of rectilinear elements having first end portions hinged to corresponding oscillating elements and second end portions hinged together on an axially movable rod; the said positioning device additionally comprising a striking wall movable under the force of at least one actuator and capable of bearing on the said rod to cause an axial movement of the said rod and, consequently, a rotation of the said oscillating elements.

There may also be an elastic device interacting with the said rod to keep the said rod in a stable position as a result of which the said traction pulleys are located in the said activation position.

The said rotation device can comprise a rotating equipment supporting the said pair of traction pulleys and rotationally movable under the force of a first motor about the said axis of advance.

The said rotating equipment can carry a first ring gear engaging with a first gear wheel which can be driven by the said first motor to cause the said rotating equipment to rotate.

The said rotating equipment can also comprise a device for transmitting the rotary motion from a second motor to the said pair of traction pulleys.

The rotary motion transmission device preferably comprises a second ring gear having external toothing which engages with a second gear wheel keyed on the output shaft of the second motor; the said ring gear also having internal toothing which engages with a third gear wheel from which extends a main shaft which transmits the rotary motion to the said first and said second traction pulley.

The said rotary motion transmission device can also comprise:
- a first bevel gear located on one end of the said main shaft;
- a second bevel gear which engages with the first bevel gear and is integral, by means of a first shaft placed perpendicularly to the axis of advance, with a first toothed pulley,
- a second toothed pulley connected to the first toothed pulley; the said second toothed pulley being immovably fixed to a first end of a second shaft having a second end which carries a fourth gear wheel engaged with a fifth gear wheel located on a third shaft carried by a first oscillating element; the said third shaft carrying the said first traction pulley;
- the said second toothed pulley transmitting its rotary motion to a third toothed pulley which is connected to a fourth toothed pulley located on the first end of a fourth shaft; a second end of the fourth shaft carrying a second traction pulley.

The present invention also relates to equipment for producing an elongate cylindrical element usable in a process of producing an optical fibre, comprising:
- a furnace capable of housing a preform of glass material;
- a traction apparatus comprising a traction device for stretching the said elongate cylindrical element from the said partially fused preform and along an axis of advance; in which the said traction apparatus additionally comprises a rotation device capable of imparting a twist to the elongate cylindrical element about the said axis of advance, simultaneously with the said traction.

In a further aspect, the present invention relates to a method of producing an elongate cylindrical element of glass material usable subsequently for the production of an optical fibre, comprising the stages of heating an end portion of a preform of glass material in such a way as to obtain fused glass material, exerting traction on the said glass material to form the said elongate cylindrical element and to advance the elongate cylindrical element along a predetermined axis, and imparting to the said elongate cylindrical element a twist about the said axis.

Preferably, the said stages of exerting traction and imparting a twist are carried out simultaneously.

BRIEF DESCRIPTION OF THE DRAWINGS

Further details can be found in the following description, which refers to the attached figures listed below:

FIG. 1 shows, in a front view, a traction device made according to the dictates of the present invention;

FIG. 2 shows, on an enlarged scale, a detail of the device of FIG. 1;

FIG. 5 shows, in a front view, the traction device of FIG. 4;

FIG. 6 shows, in a view from above, a portion of the traction device of FIG. 4;

FIG. 7 shows, in a view from above, the traction device of FIG. 4; and

DETAILED DESCRIPTION OF THE INVENTION

Figure 3:
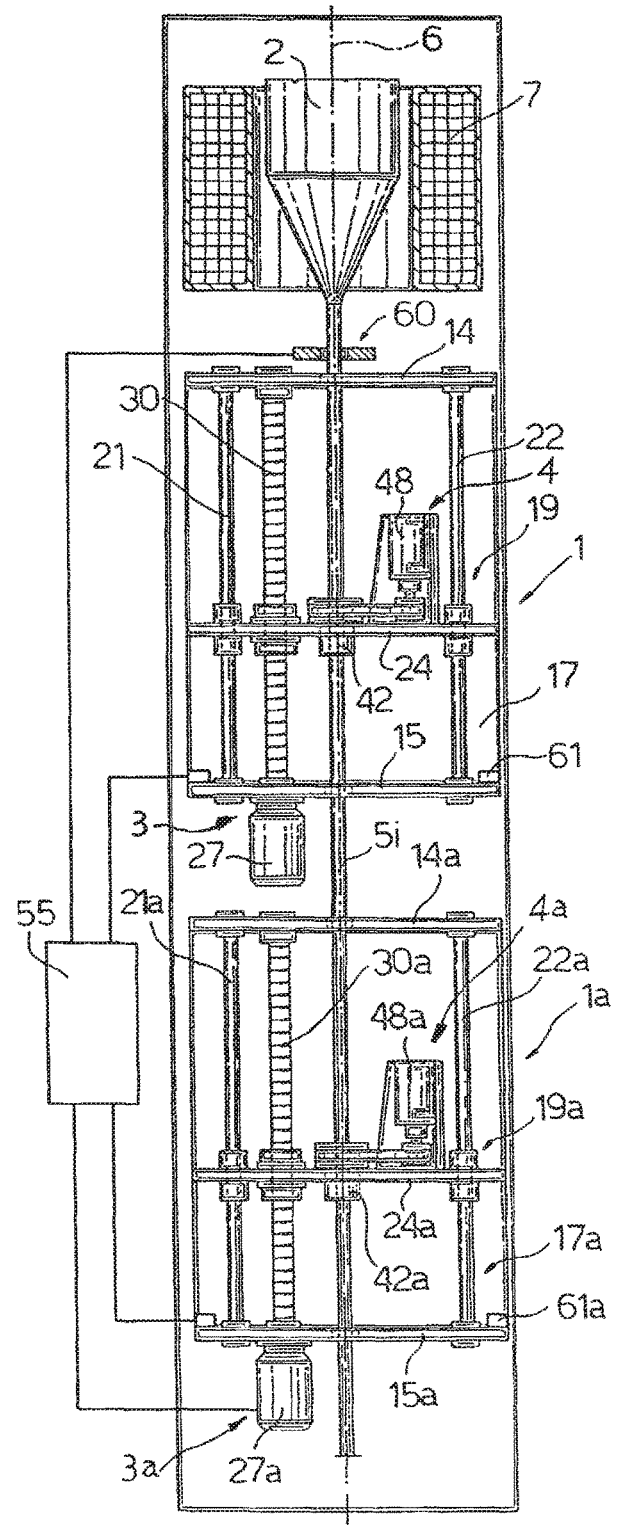
FIG. 3 shows, in a front view, a first variant of the device of FIG. 1.

An OVD process for making a preform from which an optical fibre is to be drawn comprises, briefly, the following stages:

I. a first stage during which a plurality of chemical substances are deposited, by a chemical deposition process using a burner, on a rectilinear cylindrical mandrel made from ceramic material. The substances deposited on the mandrel mainly comprise silicon oxide ($SiO_2$) typically doped with other compounds, such as germanium oxide ($GeO_2$). The product of this first stage is a cylindrical preform (core preform) of glass material which will subsequently form the core of the optical fibre;

II. a second stage in which the rectilinear ceramic mandrel is extracted from the preform, leaving a central hole in the preform;

III. a third stage in which the previously made preform is subjected to a process of drying and consolidation in a furnace in order to eliminate the hydroxide ions (—OH) and the atoms of water present in the preform; thus a vitrified preform is obtained, still having a central hole;

IV. a fourth stage in which, after the central hole of the preform has been closed (with a plug, for example) and a vacuum has been created inside it, the vitrified preform (whose diameter is typically of the order of 50-100 mm) is placed in a vertical furnace in which the fusion of a lower end of the preform is carried out. The fusion of the lower end causes the walls of the hole to collapse because of the vacuum created in the hole. The fused glass material cools, forming an elongate cylindrical element (also called the core rod) of predetermined diameter, which is stretched downwards by a traction device. This elongate cylindrical element is then cooled further and cut transversely at a number of equidistant points in such a way as to form a plurality of elongate elements, also known by the term "canes" (whose lengths are typically of the order of a meter);

V. a fifth stage in which each elongate element is subjected to a process of chemical deposition ("overcladding"), using a burner to deposit on the elongate element a plurality of chemical substances which will subsequently form the "clad", or "cladding", of the optical fibre. A substance typically used to produce the core is silicon oxide ($SiO_2$). The product of the fifth stage is a low-density final cylindrical preform; and VI. a sixth stage in which the low-density final cylindrical preform is dried and consolidated by the same procedures as those specified for the third stage. Thus a vitrified final preform is obtained; this is subsequently subjected to a drawing process similar to the process described in the fourth stage, to produce a threadlike element of glass material forming the optical fibre.

In FIG. 1, the number 1 indicates, as a whole, a traction apparatus capable of being used in the fourth stage of the aforesaid process, in equipment for producing an elongate cylindrical element usable in a process of producing an optical fibre. In particular, the apparatus 1 is capable of carrying out the stretching of a cylindrical preform 2 made from glass material to obtain an elongate cylindrical element 5 with a length of several meters and a predetermined diameter (typically in the range from 5 mm to 20 mm), coaxial with a vertical axis 6, forming an axis of advance in the process. The preform 2 consists principally of silica and suitable dopants (selected according to the transmission characteristics specified for the optical fibre) and has a diameter m the range from approximately 30 mm to 120 mm.

The apparatus 1 comprises a supporting structure 10, a traction device 3 and a rotation device 4. The apparatus cooperates with a vertical furnace 7 (which is shown schematically and is of a known type) forming part of the aforesaid equipment.

The furnace 7 forms a cylindrical cavity within which trie preform 2 is housed coaxially. The vertical furnace 7 is capable of heating a lower end portion ("neckdown") 2a of the preform 2, thus achieving the fusion of this lower portion 2a. More particularly, a fused portion of glass material flows from the lower end portion 2a towards the apparatus 1, forming the aforesaid elongate cylindrical element 5. The latter comprises an upper portion 5s which is close to the furnace 7 and is still in a plastic state, and a lower portion 5i which is connected to the apparatus 1 and is in the glassy state.

The supporting structure 10 (made from metal, for example) is located under the vertical furnace 7 and is carried by a supporting frame 11 (shown schematically). The supporting structure 10 can comprise a vertical flat rectangular wall 12 and two horizontal flat rectangular walls 14, 15 which extend perpendicularly to the wall 12 along shorter edges of the latter.

The traction device 3 comprises a vertical rectilinear guide 17 carried by the supporting structure 10 and extending between the walls 14 and 15, and a slide 19 slidable with reversible motion along the vertical guide 17. In particular, the guide 17 can comprise a pair of rectilinear cylindrical bars 21, 22 which are parallel to each other and extend between the walls 14, 15 perpendicularly to these walls.

The slide 19 can comprise a flat wall 24 provided with two circular through holes, within each of which a cylindrical tubular sleeve 25 is fitted immovably so that it is perpendicular to the wall 24 and slidable along a corresponding bar 21, 22.

The slide 19 is movable along the guide 17 under the force of an electric motor 27, which is, for example, fixed to the wall 15. The motor 27 preferably has an output shaft immovably fixed to a screw 30 which extends parallel to the bars 21, 22 between the walls 14 and 15. Preferably, the screw 30 is engaged with a nut 32, particularly a circulating ball nut, located in a through hole of the flat wall 24 and fixed immovably to the latter in such a way that the angular rotation of the screw 30 produces the linear movement of the slide 19 along the vertical guide 17.

In particular, the slide 19 is movable between an upper limit position (not shown) at which the wall 24 is close to the wall 14 and a lower limit position (not shown) at which the wall 24 is close to the wall 15.

The wall 24 also has a further circular hole 34 coaxial with the vertical axis 6 and capable of allowing the passage of the elongate cylindrical element 5. In particular, as shown in FIG. 2, the circular hole 34 houses a powered rotatable body 40 capable of being connected in an angularly immovable way with the elongate cylindrical element 5 for imparting a twist to the elongate cylindrical element 5 about the axis 6.

The rotatable body 40 can comprise a chuck 42 of a known type (of the self-centring three-jaw type, for example) which is coaxial with the axis 6, housed partially within the circular hole 34 and connected to the wall 24 with the interposition of a bearing 44. A lower portion of the chuck 42 facing the wall 15 projects from the hole 34, while an upper portion of the chuck 42, facing the wall 14, projects from the hole 34 and is connected immovably to a pulley 46.

The rotation device 4 comprises an electric motor 48 fixed to a bracket 49 fixed to the wall 24 of the slide 19. The output shaft of the electric motor 48 carries a pulley 51 connected, by means of a toothed belt 50, to the pulley 46 to cause the chuck 42 to rotate about the vertical axis 6.

The electric motors 48 and 27 are controlled by an electronic control unit 55 (FIG. 1) which can receive at its input, among other elements, a signal φ correlated with the diameter of the elongate cylindrical element 5, for example a signal generated by an optoelectronic sensor 60 placed along the cylindrical element 5 in the proximity of its upper portion 5s. An example of a sensor for measuring the diameter of the elongate cylindrical element 5 is provided in the U.S. Pat. No. 5,314,517.

In operation, after the furnace 7 has been turned on, the slide 19 is carried towards the upper limit position, the chuck 42 is opened and the solidified lower portion 5i is made to enter it. The chuck 42 is then closed on the portion 5i, establishing an angularly immovable connection between the chuck 42 and the elongate cylindrical element 5. The motor 27 is then turned on, causing the slide 19 to move towards the lower limit position, and then causing the traction (and consequent elongation, or "stretching") of the elongate cylindrical element 5 downwards at constant velocity.

The traction velocity is preferably in the range from 5 to 70 cm/min, more preferably from 15 to 35 cm/min. This range of traction velocities is selected according to the diameter of the elongate cylindrical element 5 which is to be obtained.

Simultaneously with the turning on of the motor 27, the motor 48 is turned on and causes the chuck 42 to rotate in such a way that the elongate cylindrical element 5 undergoes a twist about the axis 6 during its rectilinear linear motion along the axis 6.

The velocity of rotation of the chuck 42 is preferably such as to cause a twist of the elongate cylindrical element 5 in the range from 20 to 100 revolutions per meter, or more preferably from 20 to 60 revolutions per meter.

The twist of the elongate cylindrical element 5 is transferred to the fused lower end ("neckdown") 2a of the preform 2.

In other words, the apparatus 1 applies a torque to the elongate cylindrical element 5 in such a way that the latter undergoes a predetermined twist about the axis 6 during its formation.

The applicant has found that, owing to the simultaneous motions of linear movement along the axis 6 and twisting about the axis 6 applied to the elongate cylindrical element 5, the elongate cylindrical element 5 is intrinsically straighter than elongate cylindrical elements produced by traction apparatus of known types.

In particular, the elongate cylindrical element 5 made according to the apparatus of the present invention shows a maximum offset which is in all cases less than the offset shown by an elongate cylindrical element formed by a traction apparatus of a known type.

For example, the applicant has observed that an elongate cylindrical element with a length of approximately 100 cm and a diameter of approximately 10 mm, produced by a traction apparatus of the double pulley type, typically shows an offset in the range from 0.2 mm to 1 mm, while an elongate cylindrical element of equal length and diameter produced by means of the apparatus 1 typically shows an offset in the range from 0.05 mm to 0.2 mm.

The elongate cylindrical element 5 is then cut transversely at a number of points to form a plurality of elongate cylindrical elements known as "canes" (a cane typically has a length of the order of one meter). From four to eight canes are typically obtained from a preform of the conventional type.

Each cane is then subjected to an overcladding stage of an OVD process, by means of which the cane is covered with a layer of glassy substances, particularly silicon oxide, $SiO_2$. In this way a final preform is obtained, from which an optical fibre (not illustrated) is produced by drawing, the core of this fibre originating from the elongate cylindrical element 5, while its cladding originates from the layer deposited during the aforesaid overcladding stage.

The applicant has also observed a considerable improvement in the concentricity of optical fibres made from canes obtained by means of a traction device according to the present invention. In particular, optical fibres having values of concentricity below 0.5 µm were obtained.

If the length of the elongate cylindrical element 5 is essentially equal to the length of the guide 17, the apparatus 1 can carry out a single stage of stretching the cylindrical element 5, in which the slide 19 moves downwards from the upper limit position to the lower limit position. Alternatively, if the length of the elongate cylindrical element 5 is greater than the length of the guide 17, the apparatus 1 can carry out a plurality of successive stretching stages, at the end of each of which the slide 19 is repositioned from the lower limit position to the upper limit position. In practice, after the slide 19 has reached the lower limit position, the chuck 42 is opened, the slide 19 is moved upwards to the upper limit position, and the chuck 42 is again connected to the elongate cylindrical element 5.

To ensure the continuity of stretching of the elongate cylindrical element 5 during the repositioning of the slide 19, and particularly in order to prevent a stop of the elongate cylindrical element 5 along the axis 6 from causing an accumulation of fused material below the neckdown (and therefore a discontinuity in the diameter of the elongate cylindrical element 5), it is possible to provide (FIG. 3) an auxiliary traction device 1a located under the apparatus 1 and having a structure and operation completely identical (corresponding parts being indicated by the same numbers plus the subscript "a") to those of the apparatus 1. The apparatus 1 and 1a are both aligned with the axis 6.

In particular, the apparatus 1a comprises a traction device 3a and a rotation device 4a similar to those of the apparatus 1. Accordingly, the traction device 1a comprises a slide 19a which is initially located at the upper limit position and is provided with a chuck 42a which can be connected to the elongate element 5. When the slide 19 has reached the lower limit position and can no longer carry out the traction of the elongate cylindrical element 5, the chuck 42a is connected to the cylindrical element 5, the chuck 42 is opened and the slide 19a is moved towards its lower limit position to carry out the traction of the element 5 along the axis 6. In the same way as the apparatus 1, the apparatus 1a produces a twist of the element 5 simultaneously with its traction.

When the slide 19a reaches the lower limit position, the operations of traction of the element 5 are again carried out by the slide 19 which is located near its upper limit position.

In this case, the apparatus 1 and 1a are preferably controlled by a single electronic control unit 55 to which are sent, among other elements, signals detected by sensors 61, 61a which detect the lower limit positions of the slides 19 and 19a respectively.

The limit position sensors 61, 61a can be of the mechanical type (for example, a switch which is closed or opened by the slide 19, 19a when it is in the limit position) or a sensor of the opto-electronic type (for example, a photocell whose signal is interrupted by the slide 19, 19a when it is in the lower limit position).

In the present case, therefore, the traction device comprises a pair of powered slides 19, 19a and respective connecting bodies (chucks) 42, 42a, while the rotation device comprises the bodies 42, 42a, the respective motors 48, 48a and the corresponding elements for transmitting the motion.

Figure 4:
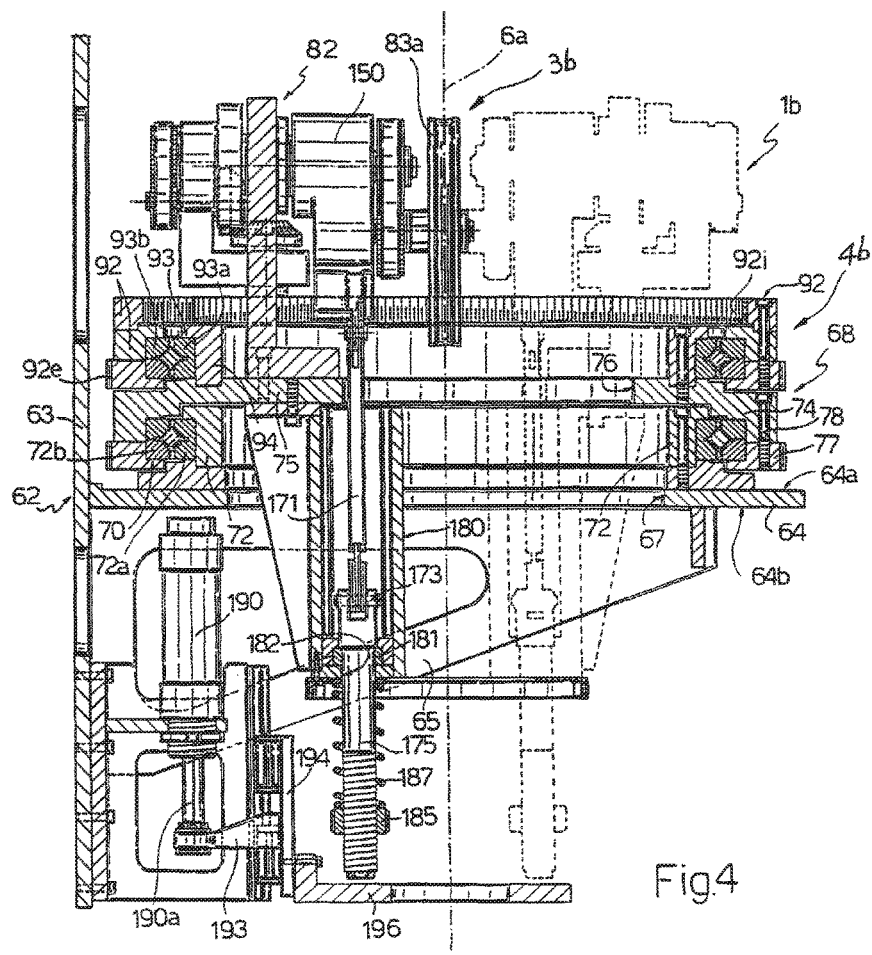
FIG. 4 shows, in a side view, a second variant of the traction device of FIG. 1.

FIG. 4 shows a further variant 1b of the apparatus according to the invention, comprising a supporting structure 62, a traction device 3b and a rotation device 4b.

The supporting structure 62 (made from metal, for example) comprises a vertical flat wall 63 and a horizontal flat wall 64 extending perpendicularly from a central portion of the vertical wall 63. The horizontal wall 64 is also supported by a pair of brackets 65, which are triangular in this particular case, fixed to the vertical wall 63.

The horizontal wall 64 has a circular central aperture 67 coaxial with an axis 6a (axis of rotation). The rotation device 4b comprises a rotating equipment 68 supported by the horizontal wall 64 by the interposition of a roller bearing 70 which allows the rotating equipment 68 to rotate with respect to the supporting structure 62 and about the axis 6a. More particularly, the horizontal wall 64 supports an annular structure 72 which is fixed to an upper face 64a of the wall 64 and extends around the perimetric edges of the aperture 67. The annular structure 72 carries a first annular element 72a of the roller bearing 72, while a second annular element 72b of the roller bearing 72, lying outside the first, is fixed immovably to the rotating equipment 68.

The rotating equipment 68 comprises a cup-shaped element in which an annular portion 74 coaxial with the axis 6a is integral with a flat wall 75 perpendicular to the axis 6a. The flat wall 75 has a through hole 76 whose function will be explained subsequently. The lower part of the annular portion 74 is connected by a plurality of screws 78 to a ring gear 77.

The ring gear 77 is engaged with a gear wheel 79 (FIG. 5) keyed on the output shaft of an electric motor 80 mounted on and projecting from the wall 64. Thus the electric motor 80 can cause the rotating equipment 68 to rotate about the axis of rotation 6a.

The traction device 3b comprises a pair of traction pulleys 83a, 83b (e.g., first pulley 83a and second pulley 83b) carried by a supporting structure 82 (FIG. 5) of the rotating equipment 68. The pulleys 83a, 83b are movable in rotation by the force of an electric motor 85 mounted on and projecting from the wall 64 and located on the opposite side of the axis of rotation 6a from the motor 80.

Each traction pulley 83a, 83b has an annular groove 84a, 84b (FIG. 7) formed in an annular portion, preferably made from elastic material, of the pulley. A median plane P of the grooves 84a, 84b, also forming the common plane in which the pulleys 83*a*, 83*b* essentially lie, is perpendicular to the axes of rotation of the pulleys and passes through the axis of rotation 6*a*. In one embodiment of transmission device 90, and as depicted in FIGS. 7 and 8, a first shaft 110, a second shaft 138, a pulley shaft 132 of the first pulley 83*a*, and a pulley shaft 164 of the second pulley 83*b* all have different axes and are positioned on the same side of common plane P formed by the first pulley 83*a* and second pulley 83*b*.

As will be explained subsequently, the pulleys 83*a*, 83*b* are movable between a rest position in which they are spaced apart from each other and an activation position in which the pulleys 83*a*, 83*b* are essentially tangential to each other and tangential to the axis of rotation 6*a*.

Figure 8:
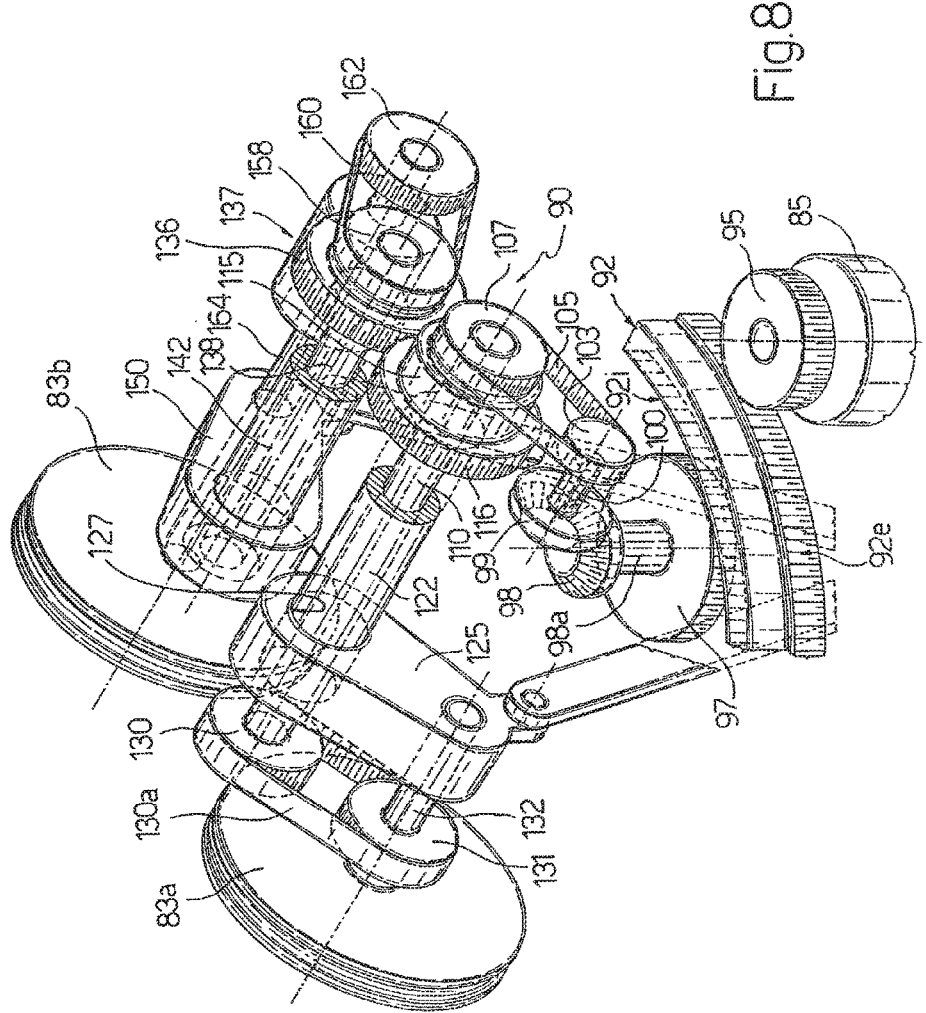
FIG. 8 shows, in a simplified perspective view, a transmission device of the traction device of FIG. 4.

The transmission device 90, forming part of the traction device 3*b* and enabling the motion to be transmitted from the motor 85 to the pulleys 83*a*, 83*b*, will now be illustrated with particular reference to FIGS. 5, 7 and 8. The transmission device 90 comprises a ring gear 92 which is connected to the flat wall 75 with the interposition of a roller bearing 93 which enables the ring 92 to rotate with respect to the rotating equipment 68 and about the axis 6*a*. More particularly, the flat wall 75 supports an annular structure 94 which extends around the perimetric edges of the flat wall 75. The annular structure 94 carries a first annular element 93*a* of the roller bearing 93, while a second annular element 93*b* of the roller bearing 93, lying outside the first, is fixed immovably to the ring gear 92. The ring gear 92 has an external toothing 92*e* (FIGS. 5 and 7) which is engaged with a gear wheel 95 keyed on the output shaft of the motor 85 and an internal toothing 92*i* which is engaged with a gear wheel 97.

From the gear wheel 97 there extends a shaft 98*a* (illustrated in FIG. 8), which is positioned parallel to the axis of rotation 6*a* and carries at its upper end a first bevel gear 98 which is engaged at 90° with a second bevel gear 99 integral with a first end of a shaft 100 which is positioned perpendicularly to the axis of rotation 6*a* and is carried by an extension 101 (FIG. 7) of the supporting structure 82. The shaft 100 has a second end which emerges from the extension 101 and is integral with a toothed pulley 103. The toothed pulley 103 is also connected, by means of a toothed belt 105, to a second toothed pulley 107 fixed immovably to a first end of a shaft 110 which is parallel to the shaft 100 and is carried by a central body 112 (FIG. 7) of the supporting structure 82. The first end of the shaft 110 also carries a cup-shaped body 115 provided with a toothed annular portion 116 whose function will be explained subsequently. The shaft 110 extends into a cylindrical cavity 120 formed in the central body 112, and it is enabled to rotate with respect to the central body 112 by a pair of bearings 123 interposed between the shaft 110 and the walls of the cylindrical cavity 120.

The shaft 110 extends into a cylindrical cavity 120 formed in the central body 112 and into a cylindrical tubular extension 122 which extends from the central body 112 perpendicularly to the axis 6*a*.

A cylindrical sleeve surrounding the shaft 110 and capable of keeping the bearings 123 at a predetermined distance apart can be placed inside the cavity 120.

A first oscillating element 125 of elongate shape (being shaped, for example, as shown in FIG. 5 or as shown in the schematic example in FIG. 8) is carried by the central body 112 and has a through hole 127 which houses the first shaft 110 and tubular extension 122, with the interposition of a ball bearing 128. The shaft 110 has a second end portion which projects from the tubular extension 122 and from the oscillating element 125, and which carries a gear wheel 130. The gear wheel 130 is engaged, by means of a toothed belt 130*a*, with a gear wheel 131 which is fixed on a median portion of a shaft 132. The latter has a first end housed in a supporting bearing 134 carried by the oscillating element 125, and a second end to which the traction pulley 83*a* is fixed immovably. The shaft 132 is also positioned parallel to the shafts 110 and 100 and is perpendicular to the axis of rotation 6*a*.

The toothed annular portion 116 is engaged with a toothed annular portion 136 of a cup-shaped body 137 carried by a shaft 138 which is positioned parallel to the shaft 110 and is carried by the central body 112. In particular, the shaft 138 extends into a cylindrical cavity 140 formed in the central body 112, and it is enabled to rotate with respect to the central body 112 by a pair of bearings 145 interposed between the shaft 138 and the walls of the cylindrical cavity 140.

In particular, the shaft 138 extends into a cylindrical cavity 140 formed in the central body 112 and into a cylindrical tubular extension 142 which extends from the central body 112 perpendicularly to the axis 6*a* and therefore parallel to the extension 122.

A cylindrical sleeve surrounding the shaft 138 and capable of keeping the bearings 145 at a predetermined distance apart can be placed inside the cavity 140.

A second oscillating element 150, shaped in the same way as the first (FIGS. 5 and 8) is carried by the central body 112 and has a through hole 152 which houses, with the interposition of a ball bearing 153, the tubular extension 142 and second shaft 138.

The cup-shaped body 137 is also integral with a toothed pulley 158 (FIGS. 7 and 8) which is engaged, by means of a toothed belt 160, with a toothed pulley 162 located at the first end of a shaft 164 carried by the second oscillating element 150. A second end of the shaft 164 emerges from the oscillating element 150 on the side opposite the pulley 162 and carries the traction pulley 83*b*. The shaft 164 is parallel to the shaft 138 and perpendicular to the axis of rotation 6*a*.

In use, the motion of the electric motor 85 is transmitted, by means of the gear wheel 95, to the ring gear 92 which rotates about the axis 6*a*. The rotation of the ring gear 92 causes the rotation of the gear wheel 97 which, because of the engagement between the bevel gears 98 and 99, causes the rotation of the pulley 103, which in turn transmits the rotary motion to the cup-shaped body 115. The rotation of the cup-shaped body 115 causes the rotation of the shaft 110, the gear wheel 130 and consequently the traction pulley 83*a*. The rotation of the cup-shaped body 115 also causes the rotation of the cup-shaped body 137. In turn, the rotation of the cup-shaped body 137 is transmitted to the pulley 162 which, by means of the rigid connection formed by the shaft 164, causes the traction pulley 83*b* to rotate.

The oscillating elements 125, 150 are driven by an opening device 170 (FIG. 5) capable of keeping the pulleys 83*a*, 83*b* normally in the activation position and capable of bringing them into the rest position when so commanded.

With reference to FIGS. 4 and 5, the opening device 170 comprises a pair of rectilinear elements 171, 172 which have first end portions hinged to end extensions of the oscillating elements 125, 150 and second end portions hinged together about a pivot 173 located on an enlarged U-shaped portion of a cylindrical rod 175. The opening device 170 also comprises a tubular structure 180 which extends downwards from the wall 75 parallel to the axis of rotation 6*a*. The tubular structure 180 has a lower end aperture closed by a plug 181 in which is formed a through hole 182 coaxial with the tubular structure 180. The enlarged U-shaped portion is housed in the tubular structure 180 with the rod 175 which engages in the aperture 182 and emerges from the plug 181. The portion of rod 175 which emerges from the plug 181 carries, at one of its ends, a ring 185 which forms a shoulder for a first end portion of a helical spring 187 which is fitted around the rod 175 and has a second end portion bearing on the plug 181. The elastic force of the helical spring 187 is capable of keeping the enlarged U-shaped portion bearing on the plug 181; in this position, the pivot 173 is in a lower position in the tubular structure 180, the rectilinear elements 171, 172 form an angle α of a few degrees between them (FIG. 5) and the oscillating elements 125, 150 are placed adjacent to each other with the pulleys 83a and 83b tangential to each other and tangential to the axis 6a (if the elongate cylindrical element 5 is absent). When a force capable of opposing the elastic force of the spring 187 is applied to the rod 175, the enlarged U-shaped portion departs from the plug 181, being moved upwards; consequently, the pivot 173 is moved towards a median position of the tubular structure 180 and the rectilinear elements 171, 172 spread apart, forming an angle β>α between them. Thus the oscillating elements 125, 150 rotate and the pulleys 83a and 83b move away from each other to enter the rest position.

Conveniently, the rod 175 is moved by means of a pneumatic actuator 190 (FIGS. 4-6) carried by the wall 63 and provided with an output shaft 190a from which a bracket 193 extends transversely, this bracket being connected to a slide 194 movable with a reversible linear motion along a vertical guide 195 carried by the metal wall 63 (FIG. 6).

The slide 194 carries a flat annular plate 196 perpendicular to the axis 6a. The annular plate 196 is movable between a lower rest position (illustrated in FIG. 4) in which it is spaced apart from the rod 175 and an upper position (not illustrated) of activation, in which the plate 196 bears on the rod 175 and pushes it upwards, compressing the spring 187.

In use, the actuator 190 is activated to bring the plate 196 into the activation position, thus causing the upward movement of the rod 175, the compression of the spring 187 and the consequent rotation of the oscillating elements 125, 150; these elements rotate in opposite directions, in such a way that the pulleys 83a and 83b move away from each other to enter the rest position.

The lower portion 5i of the elongate cylindrical element 5 is then positioned between the pulleys 83a, 83b.

The actuator 190 is then turned off and the plate 196 moves to the preceding rest position; consequently, the rod 175 returns downwards under the force of the spring 187, thus causing the oscillating elements 125, 150 to rotate in such a way that the pulleys 83a and 83b approach each other to enter the activation position.

In particular, both of the pulleys 83a, 83b are positioned tangentially to opposite sides of the elongate cylindrical element 5 with respect to the axis of rotation 6, and press against the portion 5i (which is coaxial with the axis 6a). The grooves 84a, 84b of the traction pulleys come to bear on the opposite sides of the elongate cylindrical element 5 and exert an essentially constant pressure on these, owing to the elastic force of the spring 187. Thus, an angularly fixed connection is established between the pulleys 83a, 83b and the elongate cylindrical element 5.

The motor 85 is switched on, causing the pulleys 83a, 83b to rotate in opposite directions. Thus, these pulleys apply a tractive force to the elongate cylindrical element 5 which is stretched downwards with a linear motion. In its movement, the element 5 passes through the aperture 76 of the wall 75 and the aperture 67 of the wall 64.

At the same time, the motor 80 is switched on, causing the movable element 68, and consequently the pulleys 83a, 83b, to rotate about the axis 6a.

In this way, the vertical plane P (FIG. 7) rotates about the axis of rotation 6a, and a twist about the axis 6a is therefore applied to the cylindrical element 5 during its linear downward movement.

In FIG. 4, the part of the drawing in broken lines represents the supporting structure 82 located in an angular position rotated through 180° with respect to the position shown in solid lines.

The invention claimed is:

1. A plant for producing an elongate cylindrical element usable for a process of producing an optical fibre, comprising:
   a furnace capable of housing a preform of glass material and partially fusing an extremity of said preform; and
   a traction device positioned vertically beneath the furnace and capable of being connected to at least one portion of said elongate cylindrical element from said partially fused extremity of said preform, the traction device being capable of providing traction on said elongate cylindrical element along a vertical axis of advance and imparting a twist to said elongate cylindrical element, the traction device comprising:
   a first pulley and a second pulley in a common plane and movable between a rest position in which the first pulley and the second pulley are positioned away from each other and not in contact with the elongate element, and an activation position in which the first pulley and the second pulley are in contact with the elongate element, wherein said first pulley and said second pulley are movable away from each other to enter the rest position and movable toward each other to enter the activation position;
   a first oscillating element and a second oscillating element, wherein a first shaft of a transmission device extends through a through hole of said first oscillating element, and a second shaft of the transmission device extends through a through hole of said second oscillating element;
   said first oscillating element carrying a pulley shaft of the first pulley, and said second oscillating element carrying a pulley shaft of the second pulley, the first shaft and the second shaft of the transmission device being parallel to one another and parallel to the pulley shaft of the first pulley and the pulley shaft of the second pulley;
   the first shaft, the second shaft, the pulley shaft of the first pulley, and the pulley shaft of the second pulley all having different axes and positioned on a same side of the common plane of the first pulley and the second pulley; and
   an axially movable rod positioned vertically and coupled to the first oscillating element and the second oscillating element, wherein upward axial movement of the rod is configured to move the first pulley and the second pulley away from each other and to said rest position as the first oscillating element rotates about the first shaft and the second oscillating element rotates about the second shaft.

2. The plant according to claim 1, further comprising:
   a first rectilinear element and a second rectilinear element, each having a first end portion and a second end portion, the first end portion of the first rectilinear element being hinged to said first oscillating element and the first end portion of the second rectilinear element being hinged to said second oscillating element, the second end portions being hinged together on said axially movable rod; and a flat annular plate movable under the force of at least one actuator and capable of bearing on said rod to cause said upward axial movement of said rod and the rotations of said first oscillating element and said second oscillating element.

3. The plant according to claim 2, further comprising a spring positioned to resist said upward axial movement of the rod.

* * * * *